US008837512B2

(12) United States Patent
Ericson et al.

(10) Patent No.: US 8,837,512 B2
(45) Date of Patent: Sep. 16, 2014

(54) TDMA VOICE COMMUNICATION METHOD AND APPARATUS

(75) Inventors: Daniel Wayne Ericson, Hollis, NH (US); Jun Ni, Liberty Lake, WA (US)

(73) Assignee: Harris Corporation, Melbourne, FL (US)

( * ) Notice: Subject to any disclaimer, the term of this patent is extended or adjusted under 35 U.S.C. 154(b) by 509 days.

(21) Appl. No.: 12/693,014

(22) Filed: Jan. 25, 2010

(65) Prior Publication Data

US 2011/0182301 A1 Jul. 28, 2011

(51) Int. Cl.
*H04B 7/212* (2006.01)
*H04B 7/26* (2006.01)
*H04L 1/18* (2006.01)
*H04L 1/00* (2006.01)

(52) U.S. Cl.
CPC ............ *H04B 7/2656* (2013.01); *H04L 1/1845* (2013.01); *H04L 1/0003* (2013.01); *H04L 1/1816* (2013.01)
USPC .......................................................... 370/443

(58) Field of Classification Search
CPC .................................................... H04B 7/2656
USPC .................. 370/347–348, 442–443, 458, 498
See application file for complete search history.

(56) References Cited

U.S. PATENT DOCUMENTS

| | | | |
|---|---|---|---|
| 5,757,787 A | 5/1998 | Dent | |
| 6,009,553 A | 12/1999 | Martinez et al. | |
| 6,014,375 A | 1/2000 | Janky | |
| 6,438,121 B1 * | 8/2002 | Hammons et al. | 370/345 |
| 7,085,282 B2 * | 8/2006 | Belotserkovsky et al. | 370/442 |
| 7,215,652 B1 * | 5/2007 | Foley et al. | 370/319 |
| 7,924,765 B2 * | 4/2011 | Chen et al. | 370/321 |
| 2002/0080719 A1 | 6/2002 | Parkvall et al. | |
| 2003/0039229 A1 * | 2/2003 | Ostman | 370/335 |
| 2004/0208183 A1 | 10/2004 | Balachandran et al. | |
| 2005/0180350 A1 * | 8/2005 | Kolor et al. | 370/320 |
| 2008/0025341 A1 | 1/2008 | Rao et al. | |
| 2008/0075106 A1 | 3/2008 | McDonald et al. | |
| 2009/0197630 A1 | 8/2009 | Ahn et al. | |
| 2011/0182301 A1 * | 7/2011 | Ericson et al. | 370/442 |

* cited by examiner

*Primary Examiner* — Hassan Kizou
*Assistant Examiner* — Ashil Farahmand
(74) *Attorney, Agent, or Firm* — Fox Rothschild LLP; Robert J. Sacco, Esq.

(57) ABSTRACT

In accordance with a first aspect, a method, apparatus and system is disclosed for communicating within a TDMA communication system comprising receiving data from a plurality of transmitters in a stream of TDMA super-frames, wherein each transmitter transmits payload data in one particular frame within a defined super-frame, each super-frame comprising M frames, where M is a positive integer greater than one, determining, using a processor, a quality of received data from said transmitters, and if the quality of received data from one of said transmitters is below a quality threshold, granting said one of said transmitters the right to transmit data within a second frame in said super-frames, and collectively processing in a processor said data in both frames of said super-frame assigned to said one of said transmitters to reconstruct said data from said one of said transmitters Also, a method, apparatus and system for processing data received in a TDMA communication system utilizing a stream of TDMA super-frames, each super-frame having a structure comprising M frames, each frame designed to carry data of a duration of Y time units, from a different communication channel, where Y is a positive integer, said method comprising dividing said super-frame into N/M hyper-frames, where N is a factor of M, and partitioning said data from each of said transmitters into mini-frames of duration Y/N and interleaving said mini-frames of data from each of said transmitters into a TDMA transport stream comprising super-frames of M*N mini-frame.

6 Claims, 6 Drawing Sheets

TDMA VOICE COMMUNICATION METHOD AND APPARATUS

FIELD OF THE INVENTION

The invention pertains to time division multiple access (TDMA) communication schemes.

BACKGROUND OF THE INVENTION

Time division multiple access or TDMA is a technique that allows multiple communication channels (e.g. telephone calls) to share the same frequency channel by dividing the signal on the channel into a plurality of dedicated time slots. Each user of the frequency channel is assigned one of the time slots in the frequency channel. The users transmit their data in discrete blocks within their designated time slots, each user having a particular time slot dedicated to that user. For instance, in a TDMA system that can support six communication channels (e.g. telephone calls) per frequency channel, a super-frame of, for example, 180 milliseconds may be defined. Each voice channel is assigned a time slot of one-sixth, or 30 milliseconds, of the super-frame period within which to transmit its data. Each call is assigned a different 30 millisecond segment of the 180 millisecond super-frame. In communications that demand a continuous flow of data such as voice communication, the data may be compressed, e.g., 180 milliseconds of voice data is compressed into each 30 millisecond time slot, so that the listener at the receiver end of the communication channel perceives a continuous stream of voice data, even though the actual transmission data comprises a stream of 30 millisecond long pieces of data separated by 150 millisecond intervals. A voice call spurt comprises a plurality of consecutive super-frames in which that voice call uses one of the 30 millisecond time slots in each super-frame to insert its data.

FIG. 1 illustrates an exemplary frequency channel in a TDMA communication system. The frequency channel 100 comprises a continuous stream of super-frames $103_1$, $103_2$, $103_3$, ..., $103_n$. Each frame comprises a plurality of (in this case six) 30 millisecond frames $105_1$, $105_2$, $105_3$, $105_4$, $105_5$, and $105_6$. Assuming for purposes of example that the super-frame is fully utilized, i.e., there are six active communication links A, B, C, D, E, and F, then each frame contains data from one of those communication links A-F, as shown.

As can be seen, the first super-frame $103_1$ contains a first block or portion of data from each of the six communication channels, $A_1$, $B_1$, $C_1$, $D_1$, $E_1$, and $F_1$. The next super-frame $103_2$ contains a different portion of the communication data for each of the communication links, $A_2$, $B_2$, $C_2$, $D_2$, $E_2$, and $F_2$.

The stream of super-frames continues essentially uninterrupted. When one of the links is terminated, the corresponding frame will become null or unused within the super-frame. When another communication link needs to be established, e.g., communication link G, then that unused frame may be used for that particular, new communication link.

TDMA is often used in wireless communication systems such as cellular telephone communication systems as well as land mobile radio (LMR) communication systems, including, for instance, industry standard P-25 Phase II and Harris' OpenSky™ system. The OpenSky™ system, for instance, achieves the equivalent of one voice call per 6.25 kHz of bandwidth using a combination of frequency division multiple access (FDMA) and TDMA. Specifically, each frequency channel is approximately 25 kHz wide and four voice channels are time division multiplexed within each frequency band.

LMR systems like the Harris' OpenSky™ system are commonly used by police, firefighters, municipal emergency squads, and the like. They often are implemented as rebroadcast type radio communication systems. Particularly, in typical cellular telephone communication systems, each user communicates on an essentially private channel with one other user. In rebroadcast type communication systems, on the other hand, some or all of the uplink channels to a base station are immediately rebroadcast from the base station to all the other radios in the system. More particularly, the base station receives a communication on an uplink channel and then rebroadcasts it on a downlink channel over a transmitting antenna for all other receivers within range to receive the communication.

Essentially, all electronic communication systems, and particularly wireless communication systems, have to deal with the possibility that data transmitted by a transmitter may not be received entirely accurately by the receiver. There are any number of possible sources of noise and interference, particularly in wireless communication systems, that can cause inaccurate reception of data, including multi-path interference, interchannel interference, ISI (intersymbol interference), Doppler shift, etc. Accordingly, communication systems often insert a substantial amount of overhead data in a communication channel in addition to the actual payload data that it is designed to communicate from one location to another (e.g. voice). For instance, control data and timing data often are transmitted within the payload channel or on a different channel. Furthermore, it is common to insert one or more parity bits (sometimes referred to as forward error correction bits), either per super-frame or per individual frame, in a TDMA system. As is well known in the industry, the value of the parity bit or bits is a function of the payload data according to a known algorithm. If the receiver determines that the parity bit values do not correspond exactly to the payload data it has received according to the algorithm, then it knows that some of the data likely has been received inaccurately.

In its simplest form, a single parity bit might be inserted indicating whether the number of ones (or zeros) in the payload data is an even number or an odd number. However, typically systems are much more complicated, including a plurality of parity bits, sometimes as many or more than the actual bits of payload data to which it corresponds, which can provide very detailed information indicative of which specific bits of the payload data were likely received incorrectly. For instance, a process known as forward error correction (FEC) is commonly used at the receiver to determine which bits were received incorrectly and to correct them.

In conventional TDMA communication systems, when there are fewer active communication links than the capacity of the system, time slots within the super-frame may go unused or may be used to transmit control data. For instance, in a TDMA system utilizing a six slot super-frame, if there are only four active calls during a particular period, only four slots will be used for data communication, and the other two slots in the super-frame will remain unused or may be used for transmitting control data or general broadcast messages.

In TDMA communication systems, each time a super-frame combining data from multiple communication channels is constructed, it may introduce latency into the individual communication channels. Usually, when a super-frame is assembled, it introduces a delay of at least the length of the frame. One super-frame delay period in a typical TDMA system is usually undetectable to the human ear. However, in a typical TDMA system, a frame of data of a communication channel may be assembled into, disassembled from, and reassembled into TDMA super-frames a plurality of times between the initial transmitter and the ultimate destination receiver.

For non-voice data communications, latency generally is of lesser concern because it usually is not significant if portions of data on a communication channel are delayed a few hundred milliseconds since the assembly of the data at the receiver usually is not particularly time sensitive. However, in voice communications, latency usually is more of a concern. For instance, latency of a quarter of a second in each of the uplink and downlink channels will add a half second of delay between the two human speakers in a two-way voice call, which can significantly interrupt the natural flow of human conversation.

SUMMARY OF THE INVENTION

In accordance with a first aspect of the disclosure, a method, apparatus and system is disclosed for communicating within a time division multiple access (TDMA) communication system comprising receiving N channels of voice data at a receiver in a stream of TDMA super-frames, wherein each channel comprises payload data in a particular frame within a super-frame, each super-frame comprising M frames, where M is a positive integer greater than one, determining using a processor if N is less than M, if N is less than M, granting a transmitter of one of said N channels of voice data permission to transmit extra data in the one channel in more than one frame of each of said super-frames, and collectively processing in a processor said voice data in both frames of said super-frame assigned to said one channel to reconstruct said data from said one of said transmitters.

In accordance with another aspect of the disclosure, a method, apparatus and system is disclosed for processing data received in a TDMA communication system utilizing a stream of TDMA super-frames, each super-frame having a structure comprising M frames, each frame designed to carry data of a duration of Y time units, from a different communication channel, where Y is a positive integer, the method comprising dividing the super-frame into N/M hyper-frames, where N is a factor of M, and partitioning the data from each of the transmitters into mini-frames of duration Y/N and interleaving the mini-frames of data from each of the transmitters into a TDMA transport stream comprising super-frames of M*N mini-frames.

DETAILED DESCRIPTION OF THE INVENTION

Figure 1:
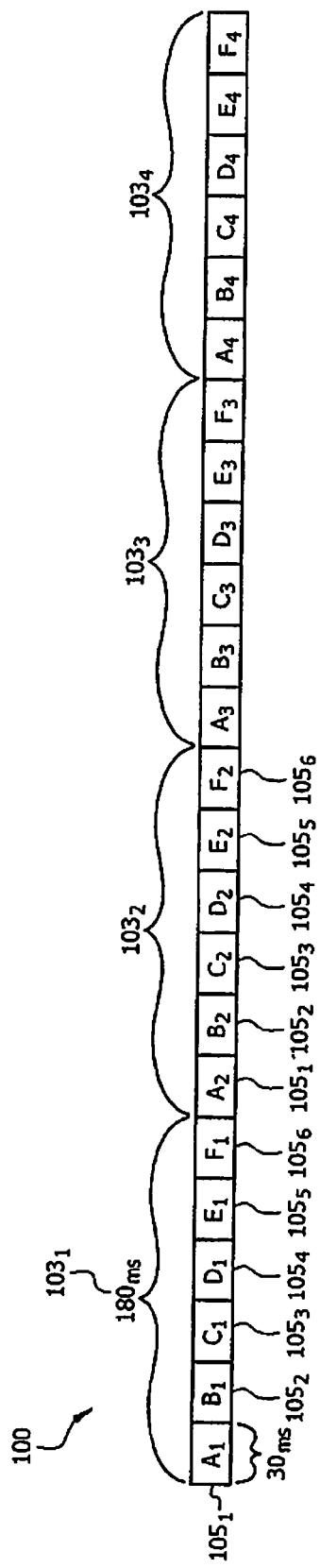
FIG. 1 illustrates the structure of a conventional stream of TDMA super-frames.

A TDMA system is described in this disclosure in which the TDMA scheme for the uplink direction and the downlink direction are different. However, this is merely exemplary.

We shall begin by defining a few terms. The uplink direction refers to communications that flow from mobile devices transmitting data to an access device that provides network connectivity to a large network. Commonly, in wireless systems, an individual portable radio such as a cellular telephone or a land mobile radio may be the transmitter in an uplink channel and the receiver is a cellular or other base station. However, this is merely exemplary. The downlink direction refers to the opposite direction, e.g., from the base station or other multiple communication link handling station to individual mobile devices, such as cellular telephones and land mobile radios (LMRs). In LMR, it is often the case that downlink transmissions are broadcast to all LMRs in the network. It also is often the case that downlink transmissions are real-time rebroadcasts of transmissions that the base station receives from the portable LMRs in an uplink channel.

A super-frame is the unit of data that comprises data from multiple communication links as a unit. A frame is the portion of a super-frame dedicated to a particular communication link according to the relevant TDMA protocol. Thus, for instance, in the example discussed in the Background section of this disclosure, the super-frame is the 180 millisecond unit of data comprising six frames of 30 milliseconds each, each 30 millisecond frame corresponding to a single communication link (either uplink or downlink). A slot or time slot is the time period within which a frame fits, e.g., 30 milliseconds. Other terms will be defined below as they are introduced.

In accordance with one feature disclosed herein, the system, e.g., an administrative node such as a base station, can decide to permit one communication link to use more than one frame in the uplink super-frame. For purposes of example, a TDMA system in which a super-frame comprises six frames for handling a maximum of six communication links per frequency channel. When the number of active calls equals the number of frames in a super-frame, then each communication link is assigned one frame in the super-frame. However, if the number of active calls (communication links) is less than the number of frames in a super-frame, then an administrative node (e.g., base station) can decide to allow one or more of the calls to utilize two (or even more) frames in the super-frame.

Thus, for example, if a base station determines that the quality of one or more particular active calls is below a certain quality level, such as by collecting one or more signal quality metrics about the received signal (for instance, bit error rate or receiver error magnitude), then the base station can grant the corresponding transmitter the right to use two (or even more) frames in the super-frame.

That extra frame or frames may be used in one of several possible ways to improve the quality of that particular communication link. For instance, in one embodiment, the transmitter may transmit duplicate data in the second frame. The receiver (e.g., the base station) can process the two frames in any of a number of ways to improve communication link quality. For instance, it may compare the two frames to each other to determine if they are identical and use this as an indication of whether the frame has been received correctly. Further, it can generate or observe quality metrics for the individual frame, such as forward error correction statistics to determine which frame has fewer errors and use that frame and discard the other frame.

In yet other embodiments, the transmitter can use the second (or additional) frame to incorporate additional overhead data. For instance, the transmitter can use the second (or subsequent) frame to transmit additional parity bits for use by the receiver to perform more accurate forward error correction. Particularly, as is well known in the related arts, the greater the number of parity bits per unit of payload data, the more accurately the receiver can correct for errors in the payload data.

Figure 2A:
FIG. 2A shows the structure of an exemplary conventional TDMA super-frame in which the number of active calls is less than the maximum supported number of calls.

For instance, FIG. 2A illustrates a super-frame 200 in a six slot TDMA system in which only four calls are presently active. As can be seen, communication link A is assigned the first frame 201a in the super-frame, communication link B is assigned the second frame 201b, communication link C is assigned the third frame 201c, and communication link D is assigned the fourth frame 201d. The fifth and sixth frames 201e and 201f are not being used at this time. If the base station determines that the quality metrics of links A and C are below a certain threshold, it may grant those links the right to use the null frames 201e and/or 201f in each super-frame 200. Thus, referring now to FIG. 2B, communication link A utilizes both the first frame 201a and the fifth frame 201e in the super-frame 200, communication link C utilizes both the third frame 201c and sixth frame 201f of the super-frame, and communication links B and D continue to use only the second frame 201b and fourth frame 201d, respectively. While this feature has been described in connection with an uplink channel, it could be used in a downlink channel, both uplink and downlink channels, or in one or both communication directions in a communication system that has no readily definable uplink versus downlink directions (e.g., peer-to-peer between two base stations).

Figure 3:
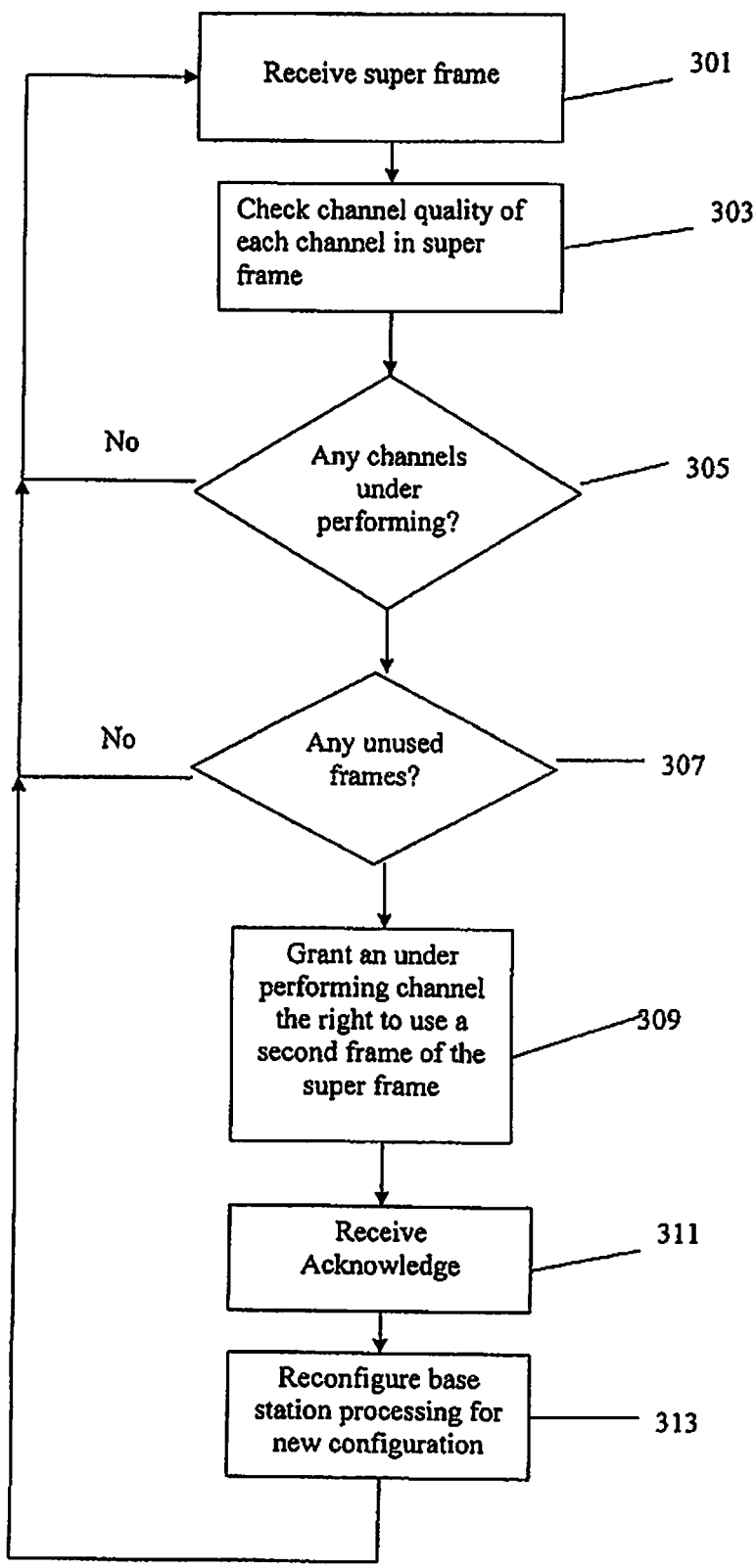
FIG. 3 is a flow chart illustrating an exemplary handshake between a receiver and a transmitter for initiating multi-slot communication in accordance with one aspect of the present disclosure.

FIG. 3 is a flow diagram illustrating one exemplary handshaking scheme for initiating multi-frame use on a particular communication link. It should be understood that the flow diagram is merely exemplary and is highly simplified to show only the basic relevant features. In any event, as shown in step 301, the base station receives a super-frame of data. In step 303, the base station checks the channel quality for each active link using one or more of the various quality metrics commonly used for such purposes. The quality metric(s) need not be based on data from a single super-frame, but may be a function of a plurality of preceding super-frames.

In step 305, it is determined if any link is performing below a desired threshold level. If not, flow proceeds back to step 301 to receive the next super-frame. If one or more of the links demonstrates poor quality, however, flow instead proceeds to step 307. In step 307, the base station determines if there are any unused frames (i.e., are there fewer active calls than the capacity of the TDMA super-frame).

If not, nothing is done and flow proceeds back to step 301. However, if there are unused frames available, flow instead proceeds to step 309. In step 309, the base station sends a control signal to the portable radio (e.g., on a downlink control channel) instructing the portable radio to utilize one of the five frames in the super-frame as a second frame.

Next, in step 311, the radio acknowledges the message by sending a suitable control signal back to the base station.

Thereafter, the radio utilizes both of its assigned frames per super-frame. As previously noted, there are several ways this can be done, including, sending duplicate data in the second frame or sending additional parity bits for forward error correction in the second frame.

Next, in step 313, the base station takes note of the fact that the particular link will now utilize two frames per super-frame (also specifying the particular frames that will be so used) and instructs other software in the base station of such facts so that the other software can configure itself to handle the two frames accordingly.

Any given link can be granted the use of any number of frames in the super-frame subject only to the system designer's balancing of countervailing factors. For instance, as noted above, in one embodiment, a designer may decide to allow a link to use more than one frame per super-frame only when the number of active calls is less than the number of frames in a super-frame. However, in other embodiments, the system may reserve frames for such use. In yet other embodiments, the system may permit a link to utilize a second or subsequent frame or super-frame only if it is not being used by another link, but allow it to continue to use it (denying access to other calls attempting to initiate) until that link is terminated. In yet further possible embodiments, the quality of the links may continue to be checked and, if it improves to a level above the aforementioned threshold (or another threshold higher than the first threshold), the administrative mode may instruct the transmitter to revert to using a single frame per super-frame. Different potential embodiments abound.

In accordance with another aspect of the invention, a hybrid-ARQ (Automatic Repeat Request) scheme may be employed to improve performance even when the frames are fully utilized. More particularly, let us consider an example in which hybrid-ARQ is used in the uplink. In accordance with this feature, the base station receives data on the uplink from the portable radios as described hereinabove. If the base station determines that the quality of the data frames received from one of those radios is below a certain threshold (e.g., based on FEC), it requires the portable radio to resent the same data in the next super-frame. Upon receiving the repeated data, the base station coherently combines the first sent frame with the repeated frame to generate a more accurate reproduction of the data, thereby improving the channel link margin.

The use of repeated frames will, of course, increase the latency of the voice or other data in that particular communication link. However, one super-frame length delay (e.g., 180 milliseconds) should be acceptable. If a particular communication link continuously requires the sending of repeated data, then the increase in latency may become unacceptable to the users. However, this problem can be alleviated by stealing frames from other simultaneously active calls or an inactive frame if the latency reaches a certain threshold (e.g., three super-frames). Alternatively, if the link if already using two frames per super-frame in accordance with the feature disclosed above, the system may temporarily suspend the use of that feature for one or a few frames, to permit the second frame that is dedicated to that link in accordance with this feature to be used to catch up.

Figure 4:
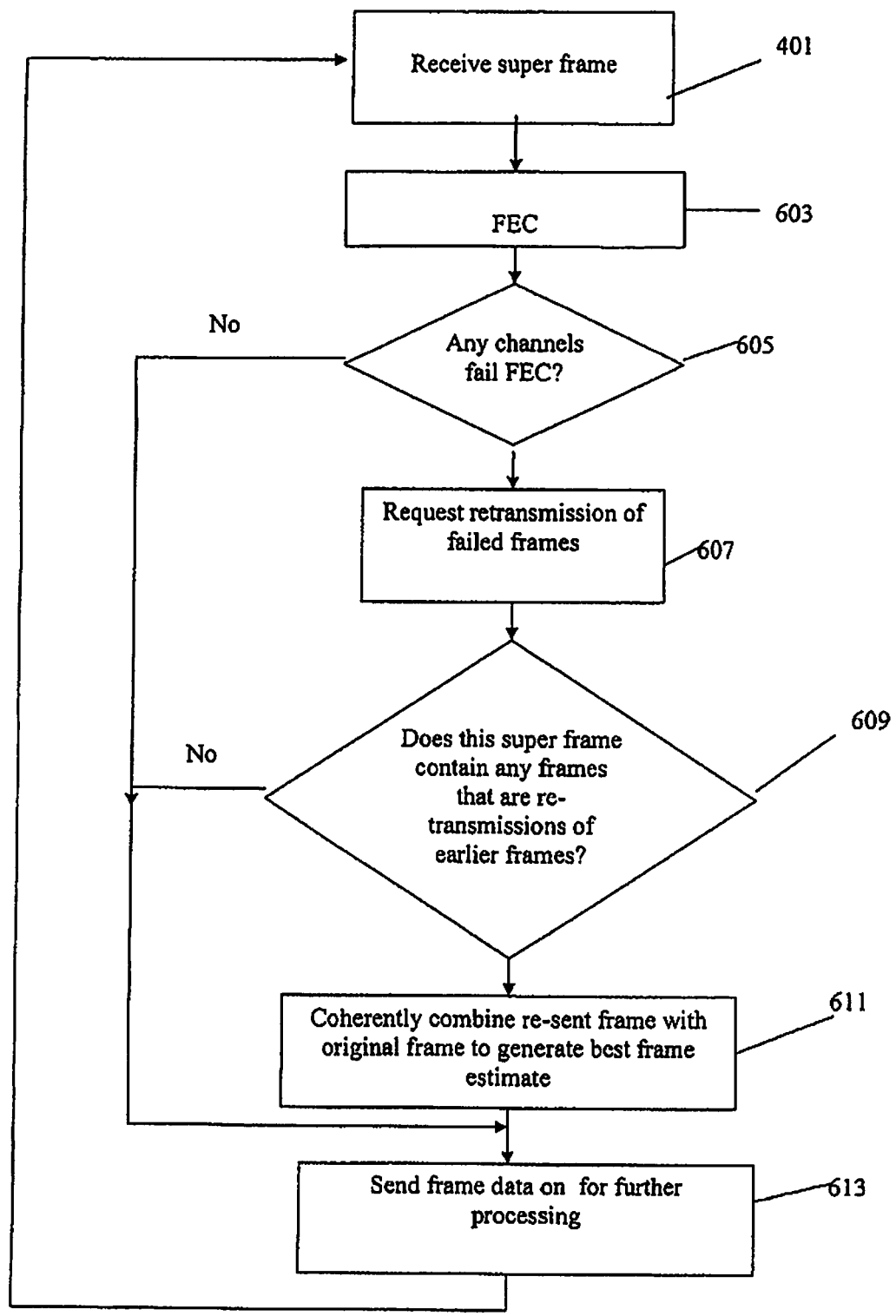
FIG. 4 is a flow chart illustrating an exemplary hybrid-ARQ handshake between a transmitter and a receiver in accordance with one aspect of the present disclosure.

FIG. 4 is a flow chart illustrating process flow in accordance with an exemplary hybrid-ARQ scheme. It should be understood that the flow diagram is merely exemplary and is highly simplified to show only the basic relevant features. In any event, in step 401, the base station receives a super-frame. In step 403, it processes the parity bits using a suitable forward error correction algorithm. Next, in step 405, a determination is made as to whether any of the frames failed forward error correction (i.e., could not be reconstructed with reasonable certainty). If no frame failed, flow proceeds to step 413 where the data in the super-frame is sent on for further processing. Then flow proceeds back to step 401 to receive the next super-frame. However, if, in step 405, it is determined that any one or more frames failed forward error correction, flow instead proceeds to step 407. In step 407, the base station sends a control signal on the downlink to the radio or radios that sent the data that failed forward error correction requesting retransmission of the frame or frames that failed forward error correction.

Next, in step 409, it determines if the present super-frame contains any frames that comprise re-sent data from a previous super-frame. If not, flow proceeds to step 613 again and then back to step 401. If, on the other hand, the current super-frame contains re-sent data, flow instead proceeds to step 411. In step 411, the base station coherently combines the re-sent frame data with the original copy of the same data in order to generate a best estimate of the frame data. Flow then proceeds to step 413, where the super-frame data is forwarded on for further processing and then back to step 401 to receive the next super-frame.

Figure 5:
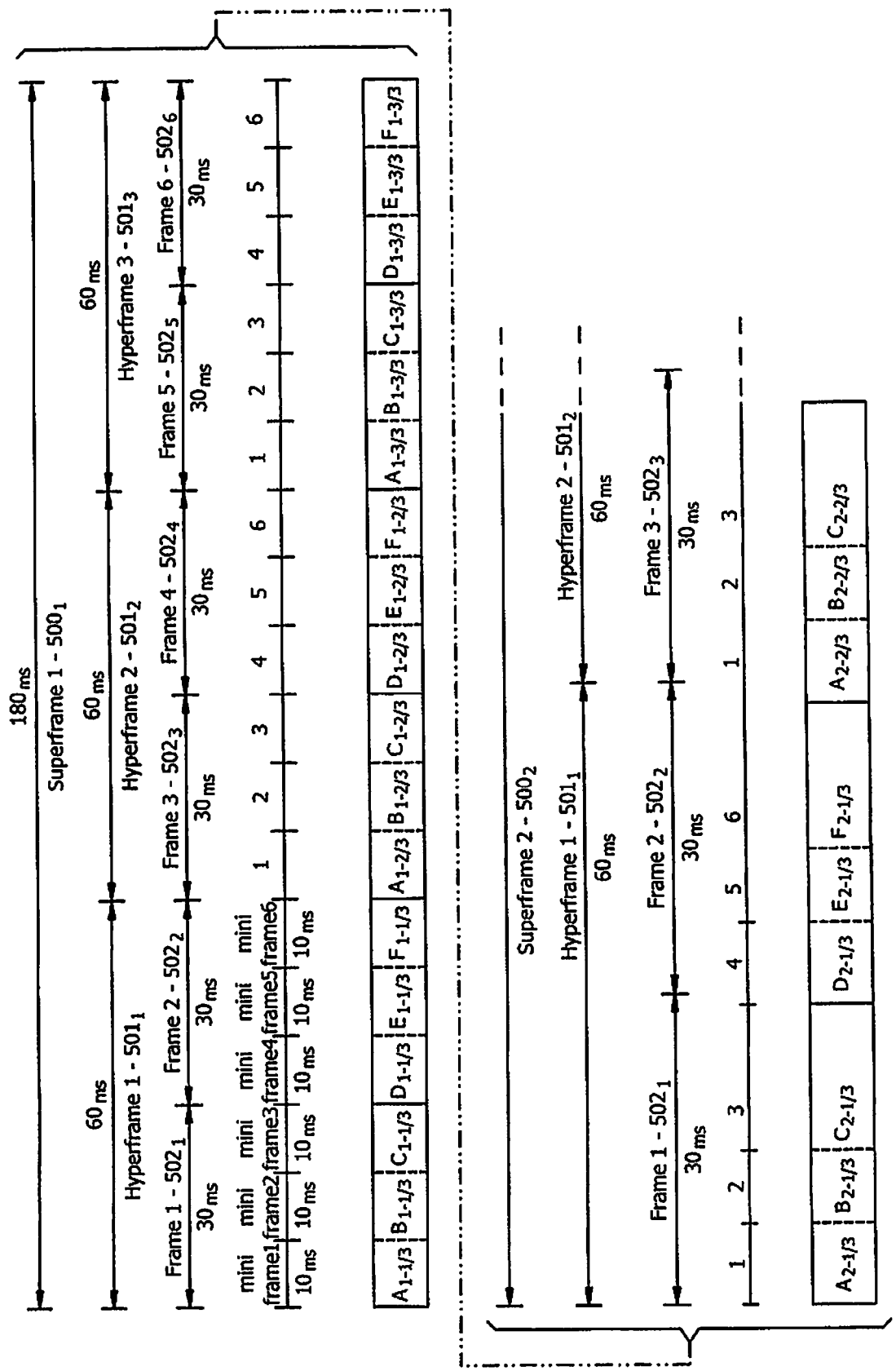
FIG. 5 shows the structure of a stream of exemplary TDMA super-frames for an uplink channel for one particular embodiment in accordance with the present disclosure.

In accordance with another aspect of the invention, the downlink TDMA super-frame is divided into a mathematical factor of the equivalent voice call capacity of the TDMA super-frame. Thus, for instance, a six frame super-frame may be partitioned by the following factors 2, 3, or 6. An eight frame super-frame may be partitioned by 2, 4, or 8. With reference to FIG. 5, dividing the six-frame super-frame 300 by a factor of 3, for example, provides three 60 millisecond partitions 501, herein termed hyper-frames. The number of TDMA channels in the super-frame structure, e.g., six in this example, is then divided evenly into each hyper-frame (rather than each super-frame, as is conventional). Thus, in this example, six TDMA channels are partitioned among two 30 millisecond frames in each of the three 60 millisecond long hyper-frames 501a, 501b, 501c. The partitioning of the links would be accomplished as shown in FIG. 5, for example. Particularly, ten milliseconds of data (i.e., one third of a frame-width of data) of each of the links A, B and C in the super-frame 300 would be compiled into the first frame 502 of the two frames $502_1$, $502_2$ forming the first hyper-frame $501_1$, and a ten millisecond sample of the date of each of links D, E and F in the super-frame 500 would be compiled into the second frame $502_2$ of the hyper-frame $501_1$. Each of these 10 millisecond segments is herein termed a mini-frame. The pattern is repeated for the second hyper-frame $301_2$ and then again for the third hyper-frame $501_3$ in the super-frame $501_1$. The next super-frame, super-frame $500_2$, follows the same pattern, as shown. Note that, in the notation in FIG. 5, the capital letter designates the particular communication link (or TDMA channel), the first subscript number following the capital letter is a sequence number designating the particular super-frame, and the second subscript fractional number designates the specific fraction of the data for that TDMA channel and super-frame. Thus, for instance, $A_{2-2/3}$ designates that it is the date of the middle third of the second super-frame of TDMA channel A.

This scheme fits within and is consistent with the fundamental timing protocol of the base TDMA framework, yet provides smaller units of data for each channel and smaller intervals between sequential units of data in each given channel in the TDMA stream. This reduces latency in the communication system and also decreases the impact of a lost unit of data on the perceived quality of a voice call.

In this manner, rather than partitioning the data corresponding to a 180 millisecond super-frame into six frames of 30 milliseconds, each frame dedicated to one of the six communication links, the super-frame comprises three 60 millisecond hyper-frames, each hyper-frame comprising a 10 millisecond sample from each of the six communication links. Thus in essence, whereas the conventional TDMA system comprises a stream of 30 millisecond samples from each of the six links strung together consecutively, this scheme provides a stream comprising 10 millisecond samples from each of the six communication links consecutively strung together. One of the advantages of this is a two-thirds reduction in latency. Particularly, in this scheme, the data samples from each channel are separated from each other by 60 milliseconds, rather than 180 milliseconds, as in the conventional art. Thus, every time a super-frame is constructed, only 60 milliseconds of delay is introduced, rather than 180 milliseconds.

Despite the partitioning of each traditional TDMA frame into a plurality of mini-frames, the forward error correction still may be conducted on a per frame basis. That is, referring, for instance, to FIG. 5 again, all of the payload data of the mini-frames for communication links A, B, and C are combined together into a frame and then forward error correction coding is performed on the entire set to produce a 30 millisecond frame of data comprising payload data from links A, B, and C plus one set of parity bits for the collective payload data (and typically other overheard data not relevant to this discussion).

There are several advantages to this scheme. First, forward error correction generally works better with larger segments of data. A soft estimate of the frame quality can be used to generate a separate quality metric for each voice call. The use of soft decisions in data processing is well known. Briefly, a soft decision indicates not just the value of a data decision, but also the certainty of that decision. In the present case, a soft decision algorithm may be used to determine whether to forward a particular frame or mini-frame of data to a vocoder (or other data processing equipment). A soft decision may be rendered for each different frame or mini-frame. By using otherwise unused frames or mini-frames to transmit additional parity bits, the quality of a soft decision as well as the specificity to particular sub-sections of the data can be greatly enhanced. Accordingly, for example, a separate high quality soft decision can be made for each mini-frame as to whether it is acceptable for forwarding to a vocoder. Also, if a frame fails forward error correction (such that it cannot be reproduced at the receiver), the duration of the lost voice data per channel is shorter, e.g., 10 milliseconds of compressed voice data (i.e., 60 milliseconds of uncompressed voice), rather than 30 milliseconds of compressed voice data (i.e., 180 milliseconds of uncompressed voice). Further, as previously noted, it lowers latency as described above.

It should be noted, however, that, even when forward error correction coding is performed on the entire frame, it still provides quality metrics individually for each mini-frame since most reasonably sophisticated forward error correction coding algorithms provides reasonably robust data at the bit level, not merely the overall frame level.

In accordance with another feature, FEC coding and modulation in the downlink can be adaptive as a function of voice load by using otherwise idle mini-frames to carry additional parity bits for the active calls, just as described above in connection with the uplink and FIGS. 2A and 2B. For instance, merely as an example, if there are one or two active calls, a 1/3 FEC code rate may be achieved by using the four otherwise inactive mini-frames to transmit additional parity bits for the two active calls.

If there are 3 or 4 active calls, a 1/2 FEC code rate may be used. If there are 5 or 6 active calls, a 2/3 FEC code rate (using no extra mini-frame allocations) may be employed. In fact, if there is one active call, that call may use a 1/6 FEC code rate, but such a large FEC code rate is probably unnecessary in most cases.

Just as in the above-described uplink feature, the portions of the super-frame that would otherwise go unutilized when there are fewer than the maximum number of active calls supported by the super-frame (i.e., the otherwise idle mini-frames) may be used by the links that are active. For instance, if there are two active calls, there would be four extra mini-frames available for use by these two calls either collectively or individually. Thus, for instance, each call could use an entire 30 millisecond frame per hyper-frame. Note that this would not simply amount to a reversion to the conventional use of the TDMA super-frame to carry 30 millisecond samples of data for six channels because the payload data rate remains the same per hyper-frame. That is, the extra 20 milliseconds available to each communication link per hyper-frame does not contain additional payload data. Rather, it contains extra parity bits (thus increasing from a 2/3 FEC code rate to a 1/3 FEC code rate when there are one or two active calls). Alternately, the extra mini-frame may be used to resend duplicate data, also as discussed above in connection with the uplink channels.

Other options also are available. Two of the 10 millisecond mini-frames can be used to send the same data and the third one can be used to transmit extra parity bits. FIG. 5 illustrates a situation in which there are three active calls. FIG. 5 illustrates one entire super-frame. In this situation, communication link A is granted the right to use the first 10 millisecond mini-frame of each of frames 1, 3, and 5 of the super-frame, link B is permitted to use the second 10 millisecond mini-frame of each of frames 1, 3, and 5, and communication link C is allowed to use the last 10 millisecond mini-frame of each of frames 1, 3 and 5. Within each hyper-frame, the $4^{th}$, $5^{th}$, and $6^{th}$ mini-frames (i.e., the entire second frame) of each hyper-frame can be used to transmit extra parity bits.

Figure 2B:
FIG. 2B shows the structure of an exemplary TDMA super-frame for a downlink channel for one exemplary embodiment in accordance with the present disclosure.
Figure 6:
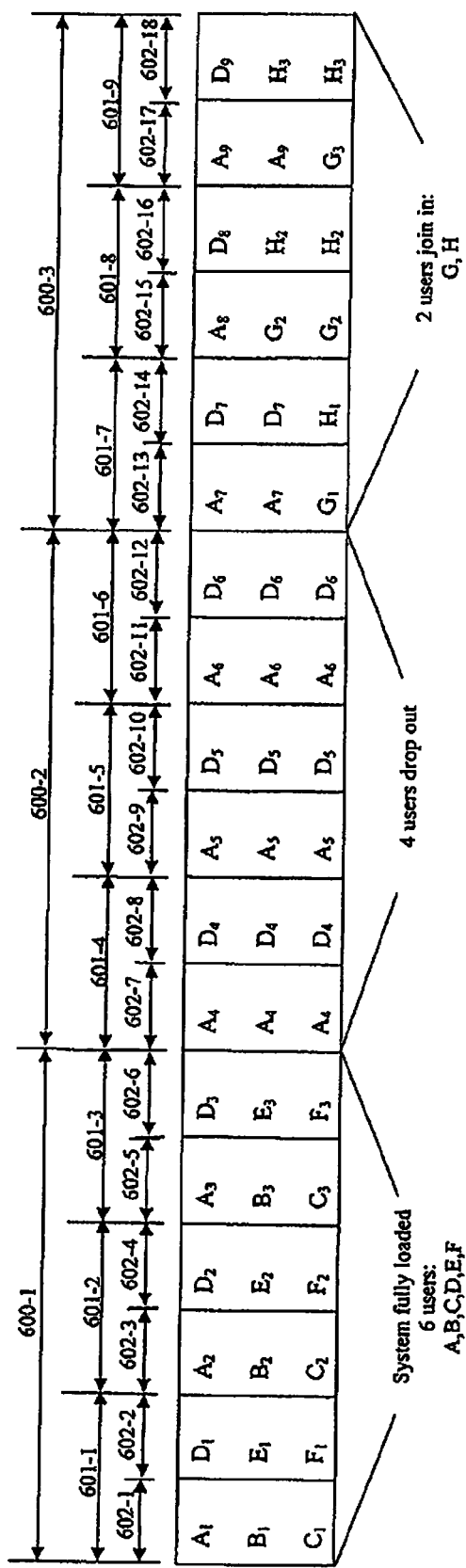
FIG. 6 is a timing diagram illustrating adaptive FEC coding in the downlink in combination with the partitioning of the voice data into mini-frames.

FIG. 6 is a timing diagram that helps illustrate one example of the combined use of the mini-frames as described above in connection with FIG. 5 and adaptive modulation in the downlink (similar to the adaptive modulation described above for the uplink connection in connection with FIG. 2B).

Note that, in the downlink in a rebroadcast system such as illustrated, one cannot base a decision as to which channel or channels should be granted the use of the extra mini-frames based on channel quality. Particularly, since, in the downlink direction, all of the channels are being broadcast to all of the mobile radios in the network and each radio will have a different channel quality, there is no channel quality per se in the downlink direction. Accordingly, the extra mini-frames should be assigned based on some other criteria, such as importance of the channel, if certain channels have higher priority, or even randomly. Furthermore, as will be discussed further below in connection with the third super-frame 600-3 in FIG. 6, each hyper-frame can be apportioned differently among the active calls so as evenly share the extra bandwidth between the channels over the entire duration of a super-frame.

In this example, for the first super-frame 600-1, the system is fully loaded with six callers, A, B, C, D, E, and F. Therefore, the modulation scheme is conventional in the sense that each time division channel (i.e., each caller) is using the same size portion of the super-frame 600-1. Specifically, each 30 ms frame 602 comprises 10 ms of data from each of three callers. As can be seen, the first frame 602-1 in super-frame 600-1 includes the first 10 ms of data for callers A, B, and C, the second frame 601-2 comprises the first 10 ms of data for callers D, E, and F, the third frame 602-3 contains the second 10 ms of data for callers A, B, and C, the fourth frame 602-4 contains the second 10 ms of data for callers D, E, and F, the fifth frame 602-5 contains the third 10 ms of data for callers A, B, and C, and the sixth frame 602-6 contains the third 10 ms of data for callers D, E, and F. Note that every two frames is a hyper-frame 601 as previously described even though we do not expressly call out the hyper-frames 601-1, 601-2, 601-3 in the discussion above.

Let us assume that, in the second super-frame 600-2, callers B, C, E, and F have dropped out. Accordingly, the remaining callers, A and D, may each use as many as three mini-frames per hyper-frame instead of one (i.e., nine mini-frames per super-frame instead of three). Accordingly, as illustrated in second super-frame 600-2, caller A may use all three mini-frames in the first frame 602-7 to transmit, for instance, three identical copies of the voice data. Likewise, caller D may use all three mini-frames in the second frame 602-8 of the second super-frame 600-2 to transmit three copies of the same voice data. Alternately, as already mentioned, instead of transmitting the same data three times for each voice channel A and D, the system can instead increase the FEC encoding from a 2/3 FEC code rate to a 1/3 FEC code rate. Also, alternately, in the embodiment in which each channel repeats the same data three times, the three copies can be distributed throughout the hyper-frame in other orders than the illustrated order of three in a row.

In any event, let us assume that in the third super-frame 600-3, callers A and D continue their calls, but new calls have been made by callers G and H. Accordingly, now there are four channels, A, B, G, and H sharing the super-frame 600-3. The super-frame 600-3 can be apportioned among the four calls in any reasonable manner. For instance, two of those calls, A and D, can be granted two mini-frames each per hyper-frame while the other two are granted one mini-frame each per hyper-frame. That usage of the bandwidth can be maintained continuously so that only calls A and B benefit. However, in the illustrated embodiment, each hyper-frame within the super-frame 600-3 can be partitioned differently so as to allow all four calls, A, B, G, and H, to share the excess bandwidth more evenly. As illustrated in the first hyper-frame 601-7 of super-frame 600-3, channels A and D use two mini-frames each while channels G and H use one mini-frame each. In the next hyper-frame 601-8, channels A and D use one mini-frame each, while channels G and H use two mini-frames each. The last hyper-frame 601-9 in super-frame 600-3 is like the first hyper-frame 601-7. The next super-frame (600-4, not shown) can be different to even more evenly share the benefits of the adaptive modulation between all four channels A, D, G, and H over a plurality of super-frames.

Figure 7:
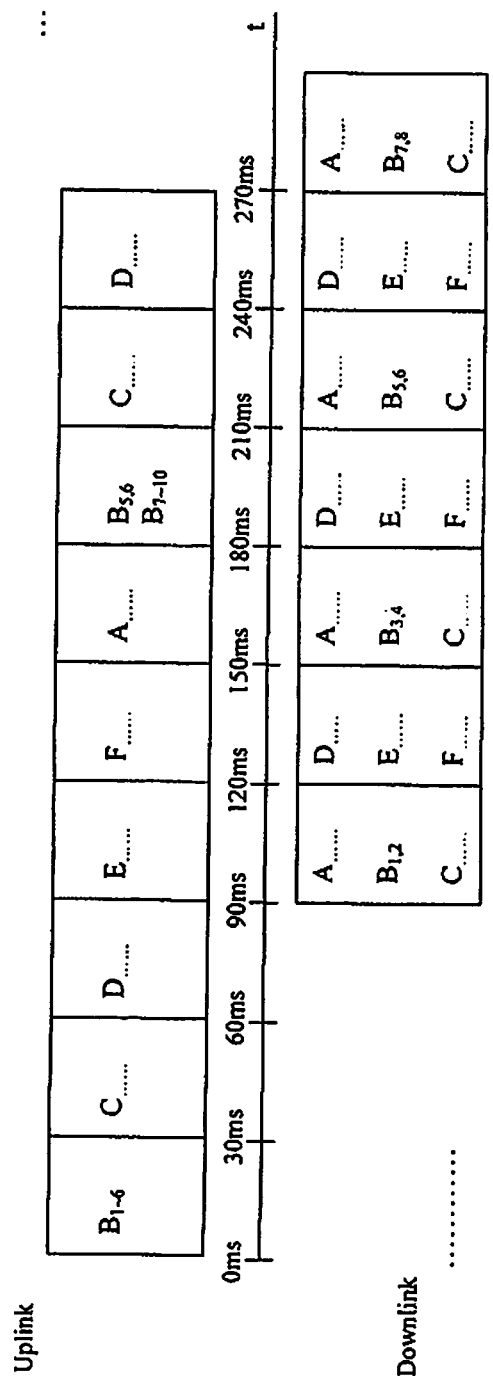
FIG. 7 is a timing diagram illustrating the use of hybrid-ARQ in combination with the partitioning of the voice data into mini-frames.

The use of hybrid-ARQ in a rebroadcast type downlink channel employing adaptive modulation as discussed above in connection with FIGS. 2B, 5, and 6 has the distinct advantage of permitting retransmission of bad voice data with less delay and, in at least some instances, no delay at all. FIG. 7 is a timing diagram for an exemplary LMR rebroadcast system using hybrid-ARQ and adaptive modulation as described in this specification illustrating this feature. FIG. 7 shows the timing of frames in both the uplink channel and the rebroadcast downlink channel on the same timeline. The uplink channel is shown above the timeline and the downlink channel is shown below the timeline. As is well known, in a rebroadcast system, the base station receives transmissions on the uplink channels from the mobile radios and rebroadcasts them in real time back out to all of the mobile radios on the downlink channel. The delay between receipt of a transmission on the uplink and rebroadcast on the downlink channel in this exemplary system is half of a super-frame, i.e., 90 ms, as can be seen in the figure.

For purposes of this discussion, we must consider the segmentation of the original, pre-transmission voice data in addition to the transmission (or air) frames, mini-frames, super-frames, and hyper-frames discussed so far in this specification. Particularly, up to this point, the discussion of mini-frames, frames, hyper-frames, and super-frames all pertained to transmitted wireless radio frequency transport layer data. However, the actual voice data generated in the radios for transmission over the wireless portion of the network also is partitioned into segments, commonly referred to as voice-frames. In one exemplary system, each voice-frame is 5 ms of compressed voice data (e.g., corresponding to 15 ms of original voice). Accordingly, in this discussion, in order to avoid confusion, we shall refer to these 5 ms voice-frames as voice-frames and all of the previously discussed mini-frames, frames, hyper-frames, and super-frames with a prefix "air-". Thus, for instance, the 30 ms frames for radio broadcast will be referred to as air-frames. Hence, each 10 ms air-mini-frame comprises two 5 ms long voice-frames.

Turning now to FIG. 7, on the uplink channel, voice data is being transmitted in conventional air-frames. That is each voice channel A, B, C, D, E, and F fills one air-frame completely with 30 ms of voice data (i.e., 6 voice-frames). However, the downlink is time division multiplexed into mini-frames as described above in connection with FIG. 5. That is, each 30 ms air-frame comprises two 5 ms voice-frames from three different channels. As can also be seen in FIG. 7, the downlink rebroadcast of data is delayed 90 ms (or half a super-frame) from that data in the uplink channel.

In the illustrated example, in the first uplink air-frame, a radio on channel B transmits six voice-frames $B_1, B_2, \ldots, B_6$ in one air-frame starting at t=0 ms. The next five air-frames are used in a similar manner by mobile radios on channels C, D, E, F, and A. However, the details of all of the channels other than channel B are not shown in the figure.

On the downlink channel, the data is rebroadcast in air-mini-frames. Thus, as previously described above in connection with FIG. 5, for instance, the air-frame starting at t=90 ms on the downlink contains two 5 ms voice-frames from each of channels A, B, and C and the next air-frame (the one starting at T=120 ms) contains two voice-frames from each of channels D, E, and F.

If, for instance, the base station determines that voice-frames 5 and 6 have too many errors, in accordance with hybrid-ARQ, the base station transmits a request on a downlink control channel (not shown) sometime between t=30 ms and t=90 ms to the mobile radio transmitting on channel B asking it to rebroadcast voice-frames $B_5$ and $B_6$. Accordingly, in the next uplink frame dedicated to channel B, i.e., the first frame in the next super-frame (starting at t=180 ms), instead of transmitting voice-frames $B_7$-$B_{12}$, retransmits voice-frames $B_5$ and $B_6$ and new voice-frames $B_7$-$B_{10}$.

Since, in accordance with the adaptive modulation scheme, voice-frames $B_5$ and $B_6$ are not re-transmitted on the rebroadcast downlink channel until the downlink frame starting at t=210 ms, the base station will actually receive the second transmission of voice-frames $B_5$ and $B_6$ before those voice-frames are re-transmitted on the downlink. Particularly, as can be seen in FIG. 7, the base station will receive voice-frames $B_5$ and $B_6$ on the uplink air-frame that starts at T=180 ms, and does not need to rebroadcast voice-frames $B_5$ and $B_6$ until the time downlink air-frame starting at T=210 ms.

Accordingly, the system completed a hybrid-ARQ operation on voice-frames $B_5$ and $B_6$ without introducing any delay whatsoever in the downlink rebroadcast of channel B.

Of course, further requests for re-transmission of voice-frames in uplink channel B may eventually cause delay in channel B. Even further, if the bad voice-frames had been any of voice-frames $B_1$-$B_4$ in this particular exemplary system, then delay would have been introduced into the downlink rebroadcast of channel B.

However, as discussed above in connection with the use of hybrid-ARQ in the uplink channel, techniques are well known for resynchronizing the various time division multiplexed channels in communication systems using hybrid-ARQ.

As will be apparent to persons working in the related arts, all of the above discussed features, steps, and processes may be implemented with software, firmware, hardware or combinations thereof embodied within the transceivers of the communication system. This includes, but is not limited to, computers, microprocessors, processors, digital signal processors, state machines, integrated circuits, FPGAs (Field Programmable Gate Arrays), combinational logic, analog circuits, digital circuits, program software, and any combinations thereof. Depending on the particular embodiment and the particular feature, step, or process, all or any apportion of the relevant software, firmware, and/or hardware may be embodied in the upstream receiver, transmitter, or transceiver (e.g., a base station) or the downstream receiver, transmitter, or transceiver (e.g., a radio).

Having thus described a few particular embodiments, various alterations, modifications and improvements will readily occurred to those skilled in the related arts. Such alterations, modification, and improvements as are made obvious by this disclosure though not expressly stated herein, are intended to be within the spirit and scope of the invention. Accordingly, the foregoing description is by way of example only, and not limiting. This patent is limited only as defined in the following claims and equivalents thereto.

We claim:

1. A method of communicating within a time division multiple access (TDMA) communication system, comprising:

receiving N communication channels of voice data at a receiver in a stream of TDMA super-frames, wherein each communication channel comprises payload data in a respective first frame within a super-frame of the TDMA super-frames, each TDMA super-frame comprising M frames, where M is a positive integer greater than one;

determining quality levels for a plurality of active calls assigned to the N communication channels, where the quality level for at least one active call is based on signal quality metrics for a plurality of preceding super-frames;

determining if N is less than M when at least one quality level of said quality levels has a value less than a predefined threshold value;

if N is less than M, granting a first transmitter of a plurality of transmitters permission to transmit extra data in a second frame and a third frame of said super-frame of said TDMA super-frames, said extra data in said second frame exclusively comprising parity data so that a number of parity bits per unit of payload data is increased and an accuracy of forward error correction performed by said receiver is improved, said extra data in said third frame comprising payload data that is duplicative of said payload data contained in said first frame, said first transmitter responsible for transmitting the active call with the quality level having a value less than the pre-defined threshold value;

collectively processing in a processor said payload data and said extra data to reconstruct said voice data from said transmitter; and periodically repeating (1) both said determining steps and (2) said granting permission step during a duration of each said active call such that a different second transmitter of said plurality of transmitters is granted permission to transmit said extra data in at least said second frame of at least one next said super-frame of said TDMA super-frames.

2. The method of claim 1, further comprising:

determining a quality of received voice data in said communication channels; and selecting one communication channel from the N communication channels as a function of the quality of the N communication channels.

3. The method of claim 1, wherein said collective processing further comprises determining which payload data in said first and third frames has fewer errors.

4. The method of claim 1, wherein said collective processing further comprises combining payload data from said first and third frames to generate a best estimate thereof.

5. A method of transmitting data within a time division multiple access (TDMA) communication system, comprising:

transmitting from a transmitter first payload data in a respective first frame within a defined super-frame, the super-frame comprising M frames, where M is a positive integer greater than one;

receiving a signal granting permission to transmit extra data within a second frame and a third frame in said super-frame when a number of received communication channels N is less than M and when a value of a quality level of an active call is less than a pre-defined threshold value, said quality level for said active call is based on signal quality metrics for a plurality of preceding super-frames; and transmitting said first payload data in said first frame and said extra data in said second and third frames;

wherein said extra data in said second frame exclusively comprises parity data so that a number of parity bits per unit of payload data is increased and an accuracy of forward error correction performed by said receiver is improved, and said extra data in said third frame comprises payload data that is duplicative of said payload data contained in said first frame.

6. A radio device for communicating within a time division multiple access (TDMA) communication system, the radio device comprising:

an electronic circuit adapted to perform the following operations receive N communication channels of voice data in a stream of TDMA super-frames, wherein each communication channel comprises payload data in a respective first frame within a super-frame of the TDMA super-frames, each TDMA super-frame comprising M frames, where M is a positive integer greater than one, determine quality levels of a plurality of active calls assigned to the N communication channels, where the quality level for at least one active call is based on signal quality metrics for a plurality of preceding super-frames, determine if N is less than M when at least one quality level of said quality levels has a value less than a pre-defined threshold value, if N is less than M, grant a transmitter of a plurality of transmitters permission to transmit extra data in second and third frames of said super-frame of said TDMA super-frames, said extra data in said second frame exclusively comprising parity data so that a number of parity bits per unit of payload data is increased and an accuracy of forward error correction performed by said receiver is improved, said extra data in said third frame comprising payload data that is duplicative of the said payload data contained in said first frame, said transmitter responsible for transmitting the active call with the quality level having a value less than the pre-defined threshold value, collectively process said payload data and said extra data to reconstruct said voice data from said transmitter, and periodically repeat (1) both said determine operations and (2) said grant operation during a duration of each said active call such that a different transmitter of a plurality of transmitters is granted permission to transmit said extra data in at least said second frame of at least one next said super-frame of said TDMA super-frames.

* * * * *